Patented Aug. 2, 1949

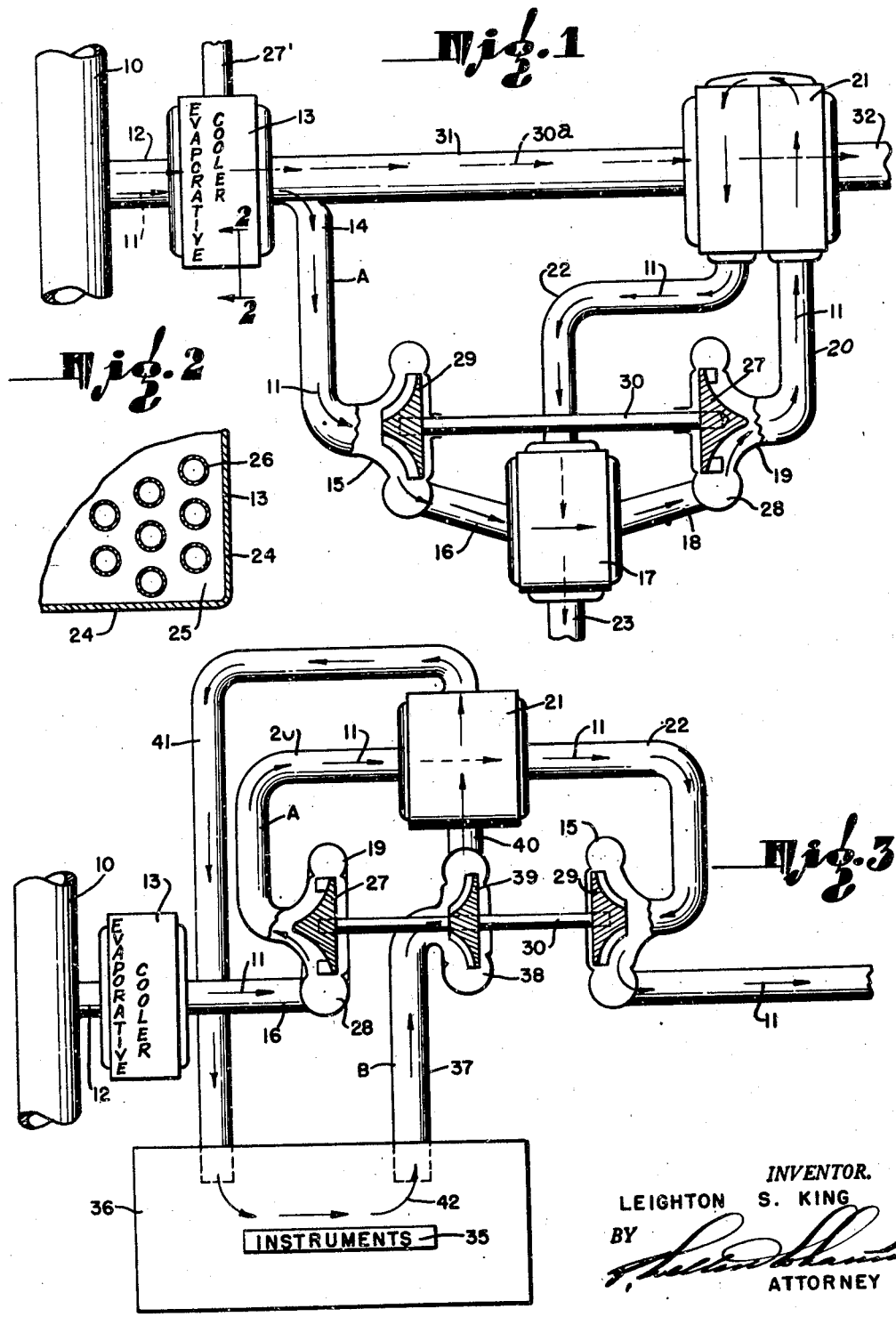

2,477,931

UNITED STATES PATENT OFFICE 2,477,931

EVAPORATIVE COOLING SYSTEM FOR AIRCRAFT HAVING EXPANSION MEANS

Leighton S. King, Los Angeles, Calif., assignor to The Garrett Corporation, Los Angeles, Calif., a corporation of California Application January 6, 1947, Serial No. 720,395

8 Claims. (Cl. 62—138)

This invention relates to cooling systems for aerial vehicles which travel at high velocities. As employed herein, "aerial vehicle" includes those objects, devices, or structures, such, for example, as missiles, rockets, bombs, and aircraft which travel through the air. Although the present invention is especially suited for use in aerial devices of unmanned type, for example, missiles, bombs and rockets, etc., it may be also advantageously employed in aircraft carrying a human pilot and/or other personnel.

In high speed aerial vehicles, the temperature of entering air increases as the velocity of the aerial vehicle increases. Also, skin friction resulting from high velocity of the vehicle relatively to the atmosphere generates heat, the result being that temperatures within the vehicle may range from several hundred degrees F. to as high as 2800° F. or higher, depending upon velocity. Temperatures such as these cannot be endured by personnel, and the sensitive instruments employed in high speed aerial vehicles for guiding or other purposes are affected or rendered inoperative by high temperatures.

It is an object of the invention to provide a cooling system of simple form which will render acceptable service in manned aerial vehicles operated in supersonic velocity range and in aerial vehicles of the unmanned type.

It is an object of the invention to provide a cooling system especially adapted for use in aerial vehicles of the general character hereinbefore described, having mechanical cooling means and including an evaporative cooling means for protecting the mechanical means from high temperatures and thereby minimizing the danger of failure of the mechanical cooling means from the effects of overheating.

It is an object of the invention to provide a cooling system wherein a gaseous medium under pressure and at high temperature is first subjected to the cooling action of an evaporative substance and is then, at safe temperature, acted upon by mechanical cooling means to bring it to the desired low temperature. In the preferred practice of the invention, hereinafter described in detail, the evaporative substance comprises water, and the mechanical cooling means comprises a heat extraction engine, such as a turbine, driven by the flow of gaseous medium under compression.

A further object of the invention is to provide a cooling system for use in high speed aerial vehicles having evaporative cooling means disposed in a path of flow of air received from a source of air under pressure, this evaporative cooling means being disposed upstream from a mechanical cooling means of the character described, there being means for passing a stream of fluid in heat exchange relation to the cooled air discharged from the mechanical cooling means.

A further object of the invention is to provide a device of the character set forth in the preceding paragraph, wherein the mechanical cooling means comprises a heat extraction engine, driven by the airflow and means utilizing at least a portion of the power recovered by the heat extraction engine to assist in moving the air through the path of flow, this air moving means being disposed downstream from the evaporative cooling means.

A further object of the invention is to provide a cooling system of the character described, having work extraction means for cooling the airflow, this work extraction means being preceded by an evaporative cooler, and the system also having a receiver for receiving and utilizing the cooled air from the work extraction means and means for passing the air from the receiver in heat exchange relation to air in the path of flow at a point upstream from the work extraction means.

A further object of the invention is to provide a system for cooling a substantially closed space in a high velocity aerial vehicle, wherein a flow of gaseous medium, such as compressed air, is first cooled by an evaporative cooler and then further cooled by passage through mechanical cooling means, the cooled gaseous medium being then employed to cool a fluid, such, for example, as an inert gas or a liquid which is circulated in the space and is also passed in heat exchange relation to the cooled gaseous medium. In the substantially closed space referred to in the foregoing, the ultimate cooling effect of the system is employed to prevent harmful temperature rise in instruments or other things housed in or along the space.

A further object of the invention is to provide a cooling system for a substantially closed space in an aerial vehicle wherein a fluid is circulated in the space and in heat exchange relation to a cooled gaseous medium by power derived from a work extraction engine employed as a mechanical means for cooling the gaseous medium. Herein the terms "air" and "gaseous medium" have been used interchangeably and are to be regarded as synonymous.

Further objects and advantages of the invention may be brought out in the following part of the specification, wherein detailed description has been employed for the purpose of fully disclosing preferred embodiments of the invention without placing limitations on the scope thereof defined by the appended claims.

Referring to the drawings which are for illustrative purposes only,

Fig. 1 is a schematic view showing a preferred form of the invention;

Fig. 2 is an enlarged fragmentary section taken as indicated by the line 2—2 of Fig. 1;

Fig. 3 is a schematic view showing an alternative form of the invention suited for the cooling of a substantially closed space in an aerial vehicle.

As a source of gaseous medium under pressure, I have, in Fig. 1, shown a duct 10 arranged in the aerial vehicle so as to receive air from a ram duct or from air compressing means such as a supercharger which feeds air to a jet engine. A path of flow A of air to be cooled follows the course indicated by the full line arrows 11 and includes the following parts: duct 12, evaporative cooler 13, duct 14, air motivating means shown as a centrifugal blower 15, duct 16 leading from the discharge of the blower 15, one pass of a heat exchanger 17, duct 18, work extraction means shown as a rotary engine or turbine 19, duct 20, receiver for the cooled gaseous medium or air from the turbine 19, shown as a heat exchanger 21, duct 22 leading from the heat exchanger 21, the second pass of the heat exchanger 17, whereby cooled air from the duct 22 is conducted in heat exchange relation to heated air passing from the duct 16 through the first pass of the heat exchanger 17 to the duct 18, and duct 23 for final disposition of the air which has traveled the course indicated in arrows 11.

The evaporative cooler 13, as shown in Fig. 2, comprises outer walls 24 defining a chamber 25 traversed by ducts shown as tubes 26 for carrying heated air from the duct 12 through the evaporative cooler 13 to the duct 14. The chamber 25 is filled with an evaporative substance, in the present instance, water, which contacts the outer surface of the tubes 26 and which, by evaporation, cools the heated air prior to its passage through the duct 14 to the blower 15. Vapors from the chamber 25 are carried off through the outlet 27' of the evaporative cooler.

The turbine 19 has a rotor 27 which is driven by the air which passes radially inwardly from the peripheral inlet chamber 28 of the turbine 19, and a cooling of the air results from the extraction of work energy from the air and also from expansion of the air as it passes through the intervane spaces of the rotor 27. Power recovered from the air by the rotor 27 is employed to drive the impeller 29 of the blower 15 which increases the compression and likewise the temperature of the air which is fed from the duct 14 through the duct 16 to the first pass of the heat exchanger 17, thereby increasing the amount of the heat exchange action in the heat exchanger 17, and also increasing the pressure drop across this turbine. Representative of the transfer of power from the rotor 27 to the impeller 29, I have shown an interconnecting shaft 30 on which the rotor 27 and the impeller 29 are fixed.

A second flow of air is conducted along the course indicated by the arrows 30a and is passed through the heat exchanger 21 in heat exchange relation to the air which has been cooled by the turbine 19. This second flow of air is cooled by its passage through the heat exchanger 21, and is then conducted to a place of utilization such, for example, as a cockpit, cabin, compartment or mechanism having need for the useful functions of the cooled air. The second flow of air is also passed through an evaporative cooler at a point preceding the heat exchanger 21. It will be understood that a second evaporative cooler may be employed for the second flow of air, but, in the present practice of the invention, the second flow of air is passed through the evaporative cooler 13 along with the airflow indicated by the arrows 11. The second flow of air, indicated by the arrows 30a, passes from the evaporative cooler 13 into a duct 31, which leads to the heat exchanger 21, and after being cooled in the heat exchanger, this second flow of air is carried by a duct 32 to the cabin or other means for utilizing the functions of the cooled air.

In the form of the invention shown in Fig. 3, many of the parts and functions disclosed with relation to Fig. 1 are employed; therefore, in Fig. 3 parts which have been previously shown and described in Fig. 1 are indicated by the same numerals to avoid repetition of description. A path of flow A, indicated by arrows 11, and proceeding from the source of fluid medium 10, is formed by duct 12, evaporative cooler 13, duct 16 which connects the outlet of the evaporative cooler 13 directly to the inlet of the work extraction means 19 and thereby avoids use of the heat exchanger 17, heat extraction means 19, duct 20, receiving means for cooled gaseous medium represented by the heat exchanger 21, duct 22, centrifugal air pump 15, and the duct 23' which conveys the air to a selected point of disposal. In the general use of the invention disclosed in Fig. 3, the gaseous medium is air which is received by the duct 10 from a ram orifice or duct, and the duct 22 is connected with the exterior of the aerial vehicle. It will be understood that the source of air under pressure 10 may receive air from mechanical compressing means, such, for example, as a supercharger.

In Fig. 3, to represent other things in an aerial vehicle which might require protection from high temperatures, I have schematically indicated instruments 35 disposed in or along a substantially closed compartment 36 in which a cooled fluid medium is circulated in such a manner that the cooling action thereof will maintain the instruments at a required low temperature. Depending, of course, upon the conditions under which the cooling effect is to be accomplished, the medium circulated in the compartment 36 may be either a liquid or gaseous fluid. A path of flow B for the fluid which is to be circulated in the compartment 36 and which is to be cooled by passing it in heat exchange relation to the cooled gaseous medium of the path of flow A is shown as including a duct 37 which receives fluid from the compartment, a pumping device 38 having an impeller 39 driven by the shaft 30 and therefore powered by the turbine 19, a duct 40 which carries the fluid from the pumping device 38 to the heat exchanger 21, so that it will be passed in heat exchange relation to the cooled gaseous medium from the turbine 19, and a duct 41 for returning the fluid in cooled condition to the compartment, wherein it circulates as indicated by arrows 42. In this form of the invention, also, the evaporative cooler 13 protects the mechanical devices of the cooling system, for example, the blower 15 and the turbine 19, from destructively high temperatures.

I claim as my invention:

1. A cooling system for use in a high speed aerial vehicle of the general character described, comprising: means establishing a path of flow of gaseous medium from a source of pressure to a point of ultimate disposition; work extraction means in said path of flow to cool the gaseous medium; evaporative cooling means in said path of flow upstream from said work extraction means for cooling the gaseous medium, said cooling means being characterized by having a substance which, by its evaporation, produces a cooling action; propelling means in said path of flow downstream from said work extraction means, driven by said work extraction means, for applying a force to assist in the movement of said gaseous medium in said path of flow; and means using power recovered by said work extraction means as a medium for accomplishing circulation of fluid, for conducting a fluid stream in heat exchange relation to the cooled gaseous medium in said path of flow.

2. A cooling system for use in a high speed aerial vehicle of the general character described, comprising: means establishing a path of flow of gaseous medium from a source of pressure to a point of ultimate disposition; work extraction means in said path of flow to cool the gaseous medium; evaporative cooling means in said path of flow for cooling the gaseous medium, said cooling means being characterized by having a substance which, by its evaporation, produces a cooling action; propelling means in said path of flow, driven by said work extraction means, for applying a force to assist in the movement of said gaseous medium in said path of flow; and means using power recovered by said work extraction means as a medium for accomplishing circulation of fluid, for conducting a fluid stream in heat exchange relation to the cooled gaseous medium in said path of flow.

3. A cooling system for use in a high speed aerial vehicle of the general character described, comprising: means establishing a path of flow of gaseous medium from a source of pressure to a point of ultimate disposition; work extraction means in said path of flow to cool the gaseous medium; evaporative cooling means in said path of flow upstream from said work extraction means for cooling the gaseous medium, said cooling means being characterized by having a substance which, by its evaporation, produces a cooling action; and means using power recovered by said work extraction means as a medium for accomplishing circulation of fluid, for conducting a fluid stream in heat exchange relation to the cooled gaseous medium in said path of flow.

4. A cooling system for use in a high speed aerial vehicle of the general character described, comprising: means establishing a path of flow of gaseous medium from a source of pressure to a point of ultimate disposition; work extraction means in said path of flow to cool the gaseous medium; evaporative cooling means in said path of flow for cooling the gaseous medium, said cooling means being characterized by having a substance which, by its evaporation, produces a cooling action; and means using power recovered by said work extraction means as a medium for accomplishing circulation of fluid, for conducting a fluid stream in heat exchange relation to the gaseous medium in said path of flow.

5. A cooling system for use in a high speed aerial vehicle of the character described, means for cooling a substantially closed space, comprising: means forming a path of flow for air received from a source of air under pressure, said path of flow having therein an evaporative cooling means and work extraction means which cools the air by removal of heat represented by work extracted from the air; a heat exchanger in said path of flow downstream from said work extraction means, said heat exchanger having first and second passage means, said first passage means being connected to said path of flow; means forming a closed circuit including said substantially closed space and said second passage means of said heat exchanger; and means, receiving power from said work extraction means, for circulating a fluid through said closed circuit.

6. A cooling system for use in a high speed aerial vehicle of the character described, means for cooling substantially closed space, comprising: means forming a path of flow for air received from a source of air under pressure, said path of flow having therein an evaporative cooling means and work extraction means which cools the air by removal of heat represented by work extracted from the air; and means driven by said work extraction means and including a heat exchanger downstream from said work extraction means for moving a fluid in heat exchange relation to said air downstream from said work extraction means and into said space.

7. A cooling system for use in a high speed aerial vehicle of the character described, means for cooling a substantially closed instrument compartment, comprising: means forming a path of flow for air received from a source of air under pressure, said path of flow having therein an evaporative cooling means and work extraction means which cools the air by removal of heat represented by work extracted from the air; a heat exchanger in said path of flow downstream from said work extraction means, said heat exchanger having first and second passage means, said first passage means being connected to said path of flow; and means forming a closed circuit including said instrument compartment and said second passage means of said heat exchanger for circulation of a fluid to cool said instrument compartment.

8. A cooling system for use in a high speed aerial vehicle of the character described, means for cooling a substantially closed space, comprising: means forming a path of flow for air received from a source of air under pressure, said path of flow having therein an evaporative cooling means and work extraction means which cools the air by removal of heat represented by work extracted from the air; means utilizing power recovered from the air by said work extraction means to assist in the movement of air in said path of flow; and means driven by said work extraction means and including a heat exchanger downstream from said work extraction means, for moving a fluid in heat exchange relation to said air downstream from said work extraction means and into said space.

LEIGHTON S. KING.

REFERENCES CITED

The following references are of record in the file of this patent:

UNITED STATES PATENTS

| Number | Name | Date |
|---|---|---|
| 515,585 | Hill | Feb. 27, 1894 |
| 2,124,289 | Ericson | July 19, 1938 |
| 2,126,266 | Laird | Aug. 9, 1938 |
| 2,304,151 | Crawford | Dec. 8, 1942 |
| 2,391,838 | Kleinhans | Dec. 25, 1945 |
| 2,453,923 | Mayo | Nov. 16, 1948 |